United States Patent [19]

Kramp et al.

[11] 4,302,994
[45] Dec. 1, 1981

[54] METHOD OF AND APPARATUS FOR REMOVING FRONT AND REAR SEGMENTS OF ROLLED WIRE

[75] Inventors: Walter Kramp, Düsseldorf; Clemens Philipp, Meerbusch, both of Fed. Rep. of Germany

[73] Assignee: Fried, Krupp Gesellschaft mit beschränkter Haftung, Essen, Fed. Rep. of Germany

[21] Appl. No.: 132,303

[22] Filed: Mar. 20, 1980

[30] Foreign Application Priority Data

Apr. 19, 1979 [DE] Fed. Rep. of Germany ....... 2915716

[51] Int. Cl.³ .......................................... B21F 11/00
[52] U.S. Cl. .......................................... 83/23; 83/39; 83/80; 83/161; 83/165; 83/167; 83/175; 83/251; 83/255; 83/262; 83/268; 83/396; 83/519; 83/564; 83/907; 83/923
[58] Field of Search ................. 83/23, 39, 80, 161, 83/165, 167, 175, 251, 255, 262, 268, 396, 519, 564, 907, 923

[56] References Cited

U.S. PATENT DOCUMENTS

| | | | |
|---|---|---|---|
| 3,095,774 | 7/1963 | Hart | 83/907 X |
| 3,222,965 | 12/1965 | Hitchcock | 83/262 X |
| 3,756,289 | 9/1973 | Rotert et al. | 83/907 X |
| 3,776,076 | 12/1973 | Hauck | 83/262 X |
| 3,838,617 | 10/1974 | Felker | 83/907 X |

*Primary Examiner*—Frank T. Yost
*Attorney, Agent, or Firm*—Becker & Becker, Inc.

[57] ABSTRACT

A method of and apparatus for removing front and rear segments of rolled wire or wire rod which, in the form of winding packages, is supplied to the apparatus (connected before a collecting device) and is subdivided by separating procedures into good windings and scrap windings. The windings, which are placed in a spiral or helical manner around a guide element and are moved parallel to the longitudinal extension thereof, are severed in the transition region between the scrap windings of the front segment and the subsequent temporarily retained or stopped good windings, and the further conveyed scrap windings are removed from the region of the guide element after a separating or dividing procedure; later, the good windings are separated in the transition region to the subsequent temporarily retained or stopped scrap windings of the rear segment, and are moved toward the collecting device before releasing the scrap windings and before the latter are divided or separated and removed from the region of the guide element. The apparatus comprises at least one separating cutter; a plurality of scrap cutters subsequently connected in the direction of movement of the winding packages, the cutting edges of the scrap cutters being pivotally arranged in the region of the windings with respect to a guide element which movably supports the winding packages in the longitudinal direction; and two stop elements arranged sequentially in the direction of movement of the winding packages, these stop elements being movable toward the guide element and between two adjacent windings.

24 Claims, 11 Drawing Figures

METHOD OF AND APPARATUS FOR REMOVING FRONT AND REAR SEGMENTS OF ROLLED WIRE

The present invention relates to a method of and apparatus for removing front and rear segments of rolled wire or wire rod, which, in the form of winding packages, is supplied to the apparatus (connected before a collecting device) and is subdivided by separating procedures into good windings and scrap windings.

With the production of wire in hot rolling plants, care must be taken that the so-called front and rear waste or scrap winding material is separated from the further useable good material region, and that the scrap is eliminated or divided out of the production process, particularly the front and rear scrap windings which are not within the quality and tolerance values to be maintained.

Inasmuch as the necessary separating devices are arranged directly after the roller blocks, the high speed of the wire makes it difficult to carry out the necessary separating procedures. These separating procedures are made possible in a known manner by a two-part banking-up or retention of the following wire at the cutting location during the cutting procedure, or also by a deflection or diverting of the wire in a different direction. The disadvantage of this known state of the art consists therein that the wire escapes or breaks out of the guides connected ahead of the separating device, or a flutter or oscillation movement is carried out by the wire causing disturbances in the guide region as a consequence thereof. Additionally, difficulties can result therefrom that the wire receives a sharp tip or point by means of a separating cut which is inclined to the longitudinal extension of the wire.

For avoiding the aforementioned disadvantages, there was furthermore already suggested to eliminate the unusable front and rear segments of the wire only after the wire had been placed in windings, for example in the region of the secondary cooling stretch. The advantage of this known state of the art consists therein that the roller speed equals zero by placement of the wire in windings, and during the separating procedure only the transporting speed, with which the individual winding packages pass through the secondary cooling stretch, needs to be considered.

The disadvantage of this procedural manner or the pertaining embodiments consists therein that the windings of the individual winding packages which result by the rolling of rod material are located one above the other and consequently cannot be readily made free from the unusable front and rear segments. The same difficulty exists when the wire is placed in a spiral or helical manner, by means of a winding placer or placement means, around a conveying device, especially around endless chains.

The object of the present invention is therefore to develop a method of and apparatus for removing, that is, separating and carrying away, the front and rear segments of wire rod or rolled wire existing in the form of winding packages. The novel method and the novel apparatus are especially to be so embodied that the technical complexity is slight and the removal of the front and rear segments of the rolled wire or wire rod proceeds in a manner as free from disturbance as possible, especially without affecting the preceding method steps.

This object, and other objects and advantages of the present invention, will appear more clearly from the following specification in connection with the accompanying drawings, in which:

The method of the present invention is characterized primarily in that the windings, which are placed in a spiral or helical manner around a guide element and are moved parallel to the longitudinal extension thereof, are severed in the transition region between the scrap windings of the front segment and the subsequent temporarily retained or stopped good windings, and the further conveyed scrap windings are removed from the region of the guide element after a separating or dividing procedure; later, the good windings are separated in the transition region to the subsequent temporarily retained or stopped scrap windings of the rear segment, and are moved toward the collecting device before releasing the scrap windings and before the latter are divided or separated and removed from the region of the guide element.

The method accordingly essentially is further characterized in that sequentially the scrap windings of the front segment of the winding package are separated from the subsequent good windings, and these are separated from the subsequent scrap windings of the rear segment; the good windings are fed to the subsequently connected collecting device and the scrap windings, including those of both the front segment and the rear segment, are separated by several separating steps into individual pieces which can be removed without difficulty from the region of the guide element before reaching the collecting device; this removal occurs by releasing and/or dropping the scrap windings from the guide element, for example into a scrap container arranged therebelow. In this connection, both separating procedures and the detachment or separation of good windings are made possible by the fact that the good windings which follow the scrap windings, or the scrap windings subsequent thereto, are temporarily retained or stopped.

The method is preferably so embodied that the scrap windings of the rear segment are set free or released before their separation; the pertaining scrap windings are thereafter not divided or separated into a plurality of individual pieces at the location where they were temporarily retained or stopped for separation of the preceding good windings, but rather the scrap windings are divided at a location on the guide element closer to the collecting device.

Expediently, the method is carried out in such a manner that the scrap windings of the rear segment of a winding package are respectively simultaneously separated or divided with the scrap windings of the front segment of the subsequent winding package. The dividing or separation procedure is delayed so long after arrival of the scrap windings of the rear segment until the scrap windings of the front segment of the subsequent winding package likewise arrive in the dividing or separating region.

To avoid that during separation of the good windings from the scrap windings of the rear segment, scrap windings, which may have been cut therewith, are moved along with the good windings toward the collecting device, provision is made to see to it that the scrap windings of the rear segment are temporarily securely clamped during the separation, these scrap windings that are clamped being those which are seized or engaged by the pertaining separating device.

To initiate the separating and severing procedure, the windings of each winding package are detected or sensed, preferably by means of at least one photocell; after passage of a predetermined number of scrap windings or total number of windings (i.e. the preceding scrap windings along with the subsequent good windings), there is first generated a control signal for the stopping or holding procedure of the good or scrap windings of the rear segment. With the passage of the first winding of a new winding package, a counting procedure is initiated which, upon reaching a certain predetermined numerical value, leads to the temporary holding of the good windings which follow the already detected or engaged scrap windings. The counting procedure is preferably continued when the good windings are further transported or advanced after severing or separating and removal of the preceding scrap windings.

The method can preferably, however, also be embodied in such a manner that the counting procedure is initiated not only with every subsequent winding package, but rather also with the termination of the stopping procedure for the good windings. In both cases, the numerical value which triggers or brings about the stopping procedure must be so adjusted that after passage of the scrap windings of the front segment possibly only the good windings, or that after passage of the good windings only the scrap windings of the rear segment of the respective winding package, are stopped. The separation procedure and the severing procedure, expediently with adjustable time delay with respect to the particular holding or stopping procedure, are advantageously likewise triggered or initiated by the control signal for the particular stopping or holding procedure; both separating procedures in each case are permitted to be triggered or initiated only after the good windings or the scrap windings of the subsequent rear segment are stopped with certainty and during a sufficiently long time interval.

The method is advantageously developed further by having the counting procedure newly initiated with every subsequent winding package. The number of scrap windings of the front segment, and the number of windings, less the scrap windings of the rear segment, of every winding package may be respectively separately detected. The dividing procedure is initiated at a preselectable time interval from the separating procedure.

The apparatus of the present invention for removing the front and rear segments of rolled wire is characterized primarily by at least one separating cutter 10, 49; a plurality of scrap cutters subsequently connected in the direction of movement (arrow 6) of the winding packages, 3, the cutting edges 36', 37' of the scrap cutters 13 being pivotally arranged in the region of the windings with respect to a guide element which movably supports the winding packages in the longitudinal direction; and two stop elements 9, 11; 50, 9 arranged sequentially in the direction of movement of the winding packages, these stop elements being movable toward the guide element and between two adjacent windings. By means of this apparatus the winding regions to be separated from each other, i.e. the good windings and the scrap windings of the front segment or rear segment of the winding packages, are drawn apart and consequently made separable from each other.

Preferred embodiments of the novel apparatus additionally include the following features. A stop element 9, 50 is respectively arranged at least before every separating cutter 10, 49 as seen in the direction of movement (arrow 6) of the winding packages. Two scrap cutters 13 capable of being pivoted or moved outwardly are oppositely located at right angles to the longitudinal extension 2' of the guide element 2 and project partially into the guide element in the cutting position. Connected before each scrap cutter 13 is a carry-along or synchronization lever 12 which is movable with respect to the guide element, as seen in the direction of movement (arrow 6) of the winding packages 3. This lever 12, in its operating position, closes the cutter opening defined by the scrap cutters-knives 36', 37'. A pivotable scrap removal lever 14 with a rotatable scrap fork 15 is arranged in the region of the scrap cutters 13 above the guide elements 2. The stop elements 9, 11, 50 are connected with their adjustment unit 16, 17, 18 accompanied by intermediate connection of a spring element. The stop elements are embodied as rods or bars 9, 11, 50 with a tip directed toward the guide element 2. Each separating cutter 10, 49 is pivotable from below into the region of the windings in such a manner that the cutters or cutting edges 25, 26; 52, 53 thereof are located at least substantially at right angles to the cross section of the winding to be cut. At least one photocell 22, 51 is connected before the first separating cutter 10, 49 in the direction of movement (arrow 6) of the winding packages 3. By means of this photocell 22, 51, the adjustment drive 18 of at least one stop element 9, 11, 50 is controlled or regulated. The scrap cutters 13 are controlled by a control member 54 in such a manner that the cutting procedure is only then triggered when the scrap windings of the rear segment and those of the front segment of the following winding package 3 are located in the cutting opening 36', 37'. A clamping device 33 for securely holding the windings located in the cutting opening is provided below the cutters 25, 26 of the single separating cutter 10; this clamping device is capable of being actuated with the cutting movement. The second stop element 11 is arranged in the region between the single separating cutter 10 and the scrap cutters 13. As seen in the direction of movement (arrow 6) of the winding packages 3, a first separating cutter 49 for separating the scrap windings of the front segment, and a second separating cutter 10 for separating the scrap windings of the rear segment, are provided. The separating cutters 49, 10 are arranged on different sides of the guide element 2. A scrap removal plate 7 is arranged in the region of the scrap cutters 13 below the guide element 2. The guide element comprises a guide pipe or element 2, the upper half of which is equipped on both sides with an endless chain 47, 48 extending in the longitudinal direction and supported on consoles 47', 48'.

In case the apparatus is equipped with only one separating cutter, this advantageously additionally has a clamping device, by means of which the wire windings, which have come into the region of the cutting opening, are held or secured after termination of the cutting procedure until the separating cutter is open again.

Another preferred embodiment of the novel apparatus is equipped with two separating cutters located serially or sequentially in the direction of movement of the rolled wire, whereby the separating cutters are expediently arranged upon different sides of the guide element. This embodiment is capable of functioning satisfactorily even at the highest rolling speeds and extremely short intermediate spacing between the rods or bars which serve as starting material. Its advantage consists therein that, conditioned by the utilization of two serially or subsequently connected separating cutters which are independent of one another, the separation of the scrap windings of the subsequent winding package can already be initiated when the separation procedure of the scrap windings of the rear segment of the preceding winding package has not yet been concluded. The handling of scrap windings of the rear segment and of the front segment in a manner overlapping in time permits an increase in the production output.

Figure 1:
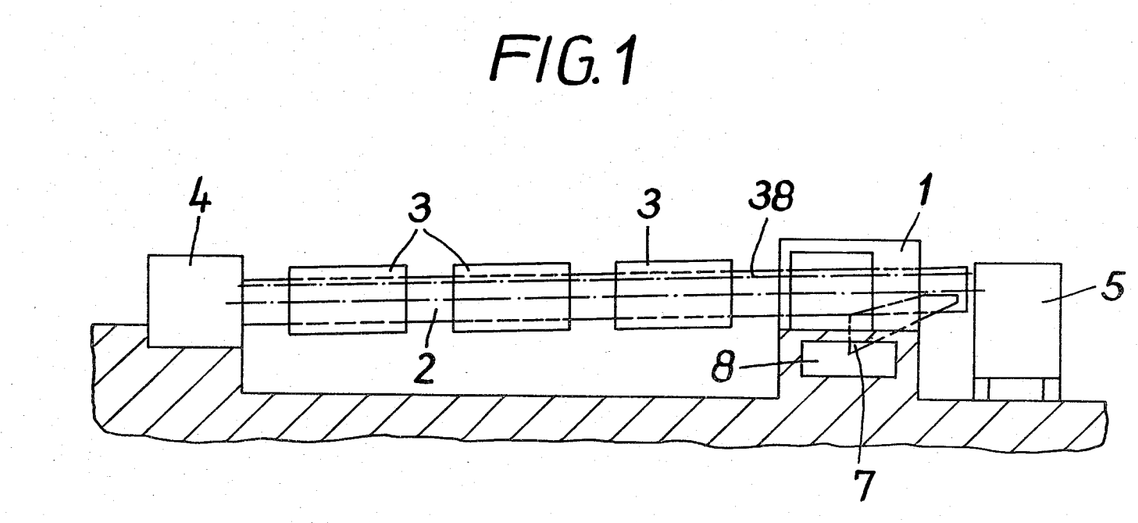
FIG. 1 shows a schematic illustration of a secondary cooling section equipped with the novel apparatus of the present invention.

Referring now to the drawings in detail, the novel removal device 1 of the present invention as illustrated in FIG. 1 operates together with a guide pipe 2, around which the windings of winding packages 3, which follow each other with spacing, are placed in a spiral or helical manner by means of a winding placer 4. The guide pipe 2 is equipped on its upper half in the longitudinal direction on both sides with endless chains (see FIG. 3), upon which the winding packages are guided or conveyed into the region of the removal device 1, and a subsequently connected collecting device 5. The construction of the winding placer 4 and the collecting device 5 in this connection cannot be considered meaningful; essential is only that the windings of the individual winding packages follow each other in the longitudinal direction or extension of the guide pipe 2 and surround the guide pipe 2 in a spiral or helical manner. The winding placer 4 is connected after the roller path or rolling mill, not illustrated, in a known manner, the latter transforming the starting material, which is supplied in rod or bar form, into a rolled wire of predetermined length, which finally forms a winding package with a predetermined longitudinal extension.

Figure 2:
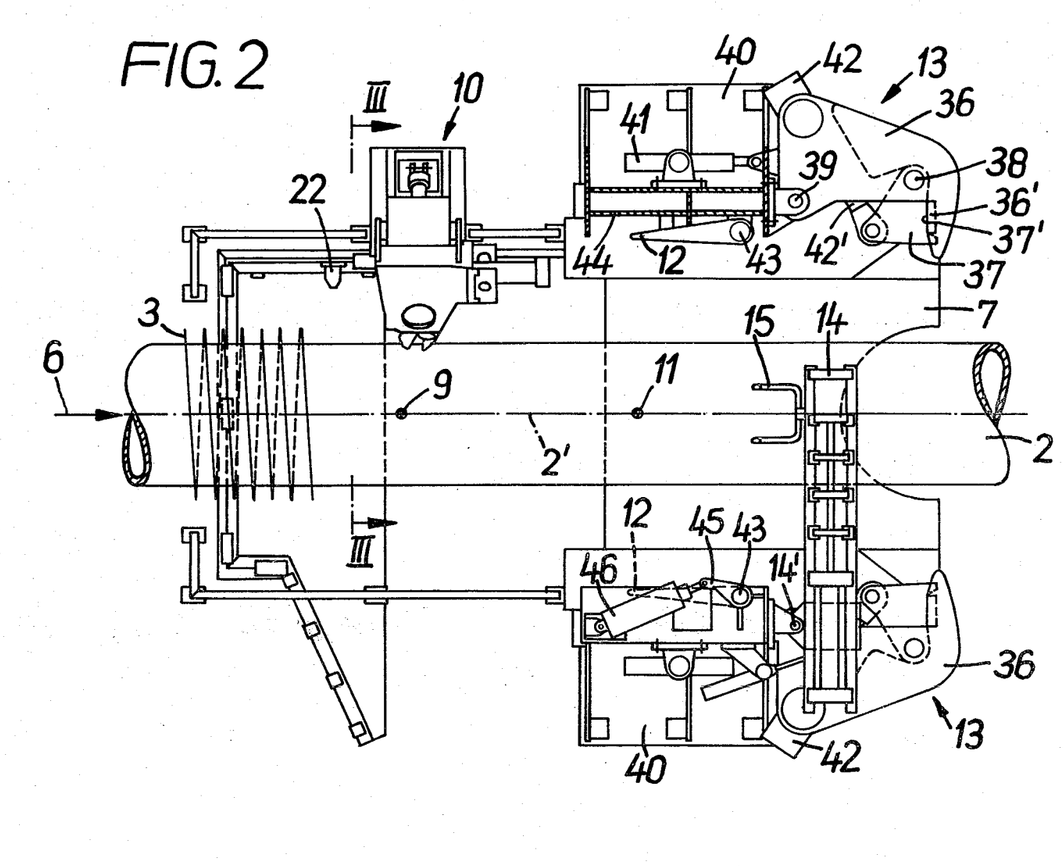
FIG. 2 is a plan view of a removal device equipped with a single separating cutter and with two scrap cutters in rest position.
Figure 2A:
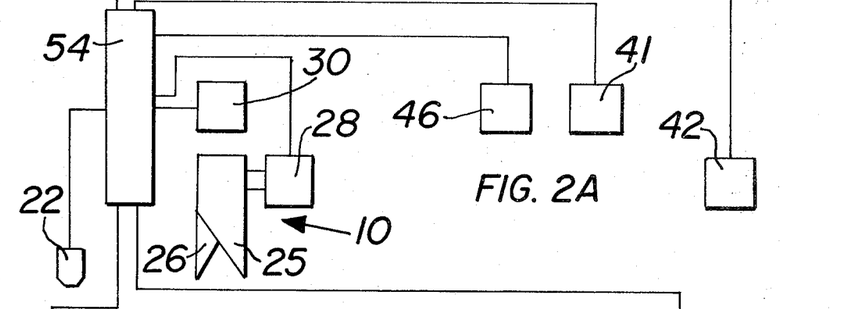
FIG. 2A is a schematic diagram showing features of the present invention.

The direction of movement of the winding packages is represented by the arrow 6 (FIG. 2). The removal device has a scrap removal plate 7 arranged on that side thereof facing the collecting device 5. This scrap removal plate 7 supplied the divided or separated scrap windings to a scrap container 8 arranged below the removal device.

The preferred embodiment of the removal device illustrated in FIGS. 2 to 7, as seen in the direction of movement of the winding packages 3, has as essential components a first stop rod 9, a separating cutter 10, a second stop rod 11, two movable carryalong or synchronization levers 12, and two scrap cutters 13 cooperating therewith.

A movable scrap removal lever 14 is arranged in the region of the scrap cutter 13 above the guide pipe 2, which passes through the removal device 1. The lever 14 has an end section on the pipe side equipped with a rotatable scrap fork 15. This scrap fork 15 serves to lift away from the guide pipe 2 the scrap windings which are divided or separated by means of the scrap cutter 13, and also serves to drop the separated scrap windings upon the already mentioned inclined scrap removal plate 7.

The respective serially connected stop rods 9 and 11, as well as the pertaining drive units, are identically embodied; accordingly, in the following paragraphs only the construction of the stop rod 9 and the pertaining drive unit are described in detail.

Figure 3:
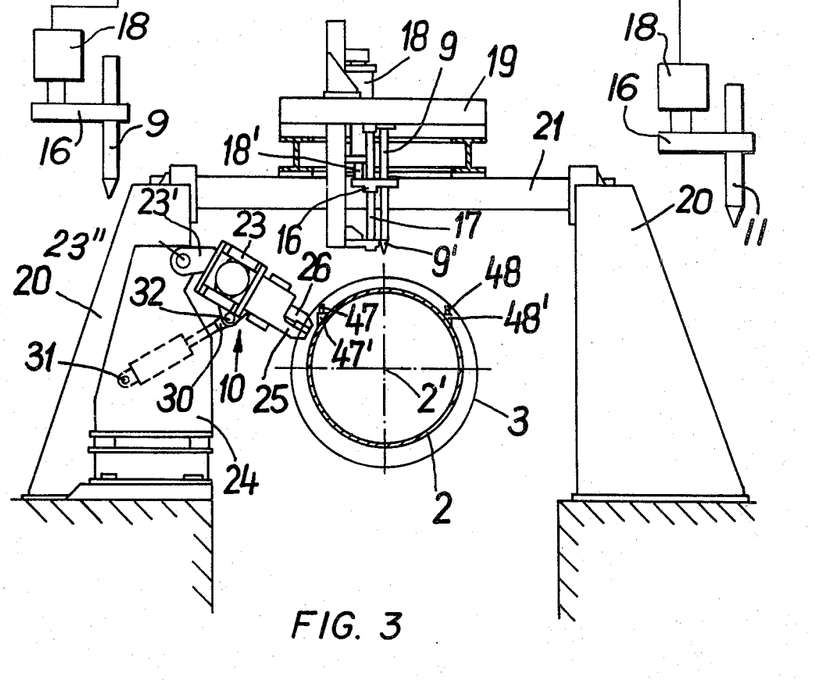
FIG. 3 is a cross section taken along the line III—III in FIG. 2.
Figure 4:
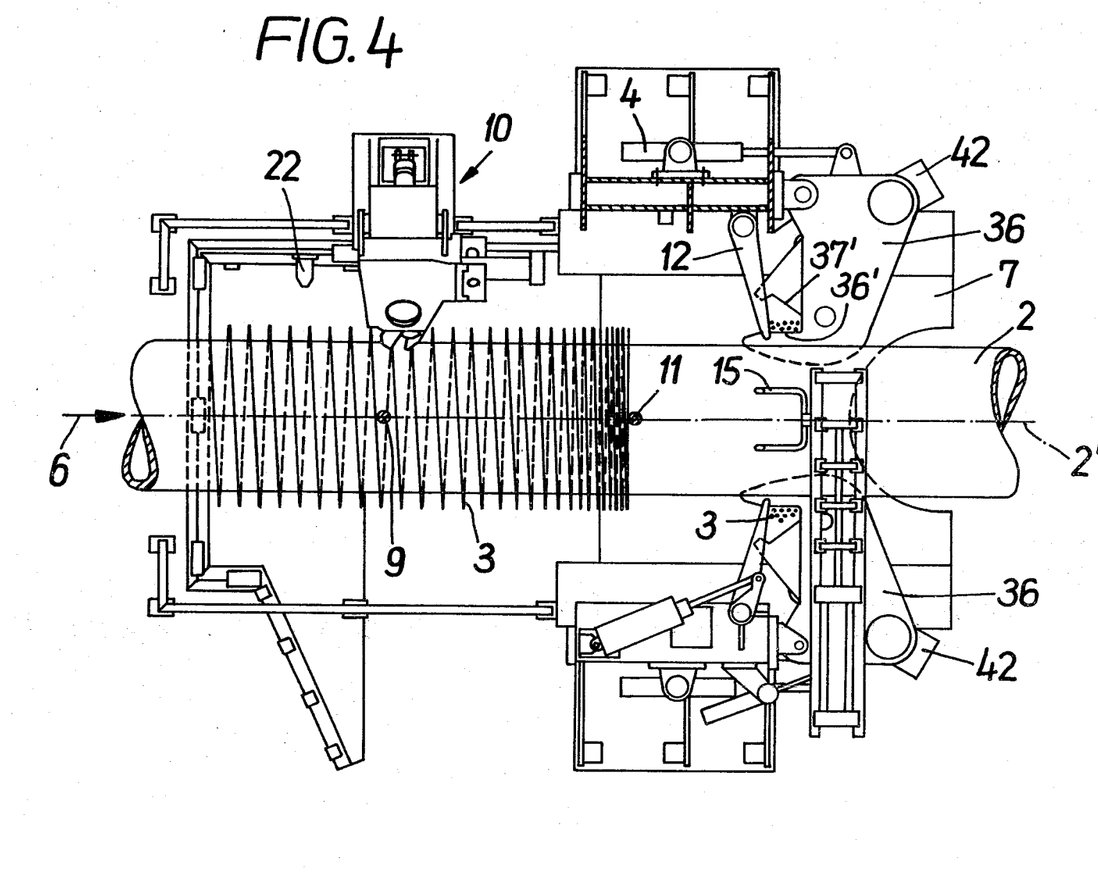
FIG. 4 is a plan view of the apparatus according to FIG. 2 with the scrap cutters in operating position and with the good windings stopped.

The stop rod 9, which is equipped with a tip 9' and is shiftable radially on the guide pipe 2, is supported by a guide console 16 on a guide rod 17 (FIG. 3). Additionally, the piston rod 18' of a compressed air cylinder unit 18 is fastened on the guide console 16. Both the compressed air unit 18 and the guide rod 17 are fixed or fastened stationarily on a frame 19, which in turn rests upon a transfer carrier or beam 21 fastened on consoles 20. The beam 21 spans the guide rod 2 transverse to the longitudinal extension thereof.

The stop rod 9 is preferably resiliently connected with the guide console; the stop rod 9 consequently, in extended condition, engages yieldably against the upper surface of the guide rod 2 and can adapt to possibly occurring changes of position of the guide pipe.

A photocell 22 is associated with the compressed air cylinder units of the stop rods 9 and 11 for technical control reasons. This photocell 22, as seen in the direction of the arrow 6, is located ahead of the separating cutter 10. The photocell 22 serves to detect or sense the passing windings of the sequentially following winding packages, and to generate a control impulse at a suitable point of time, which has as a consequence an extension or going out-movement of either the stop rod 9 or the stop rod 11 in a direction toward the guide pipe 2.

Figure 5:
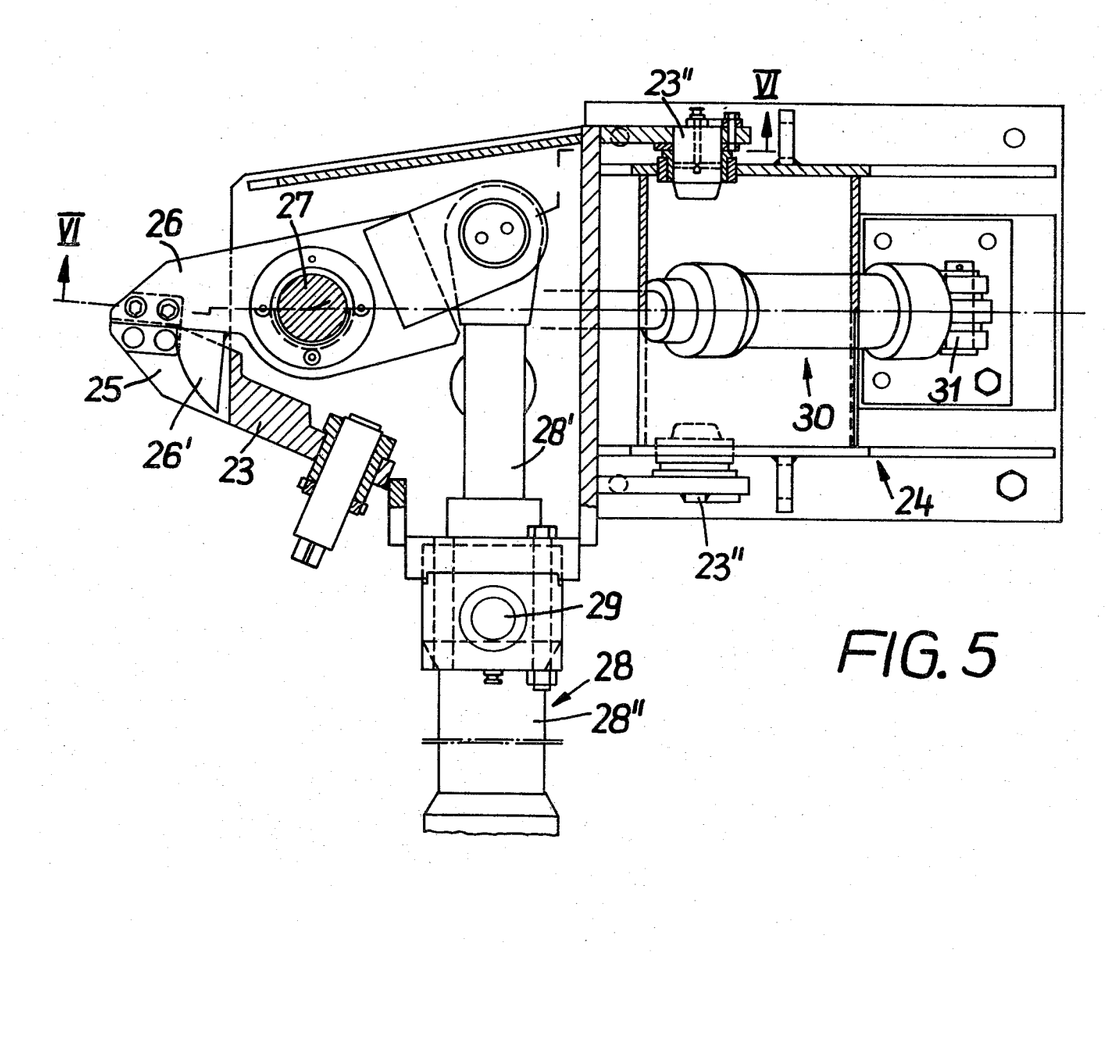
FIG. 5 is a vertical section taken through the separating cutter illustrated in FIG. 3.
Figure 6:
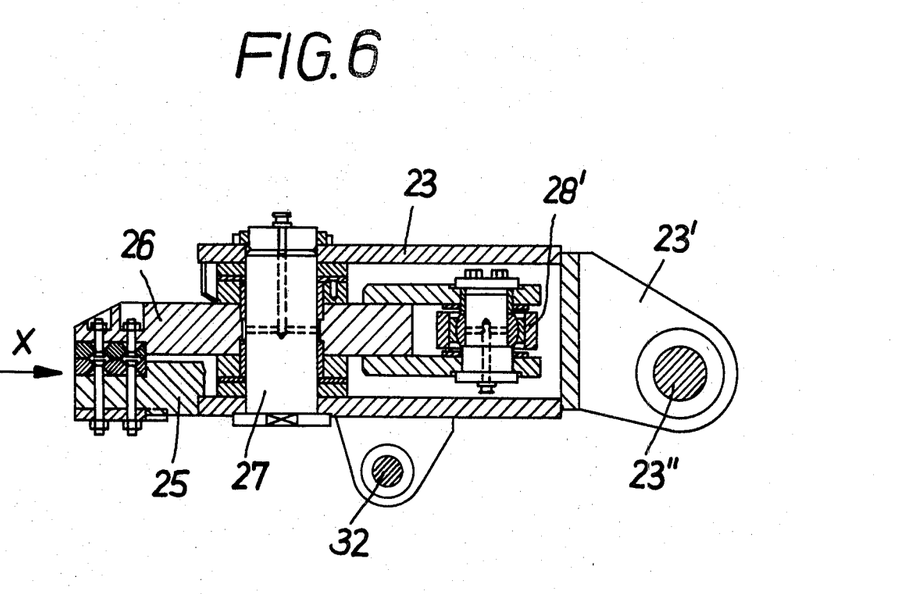
FIG. 6 is a section taken along the line VI—VI in FIG. 5.
Figure 7:
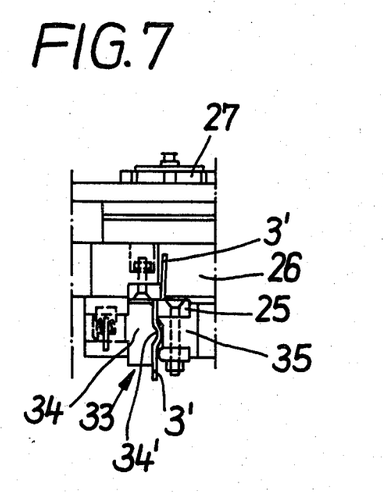
FIG. 7 is a view taken in the direction of the arrow X in FIG. 6.

The separating cutter 10 has as an essential component a housing 23 which is secured on a stationary console 24 and is movable by means of a pivot arm 23' and a rotary bolt or stud 23'' (FIG. 3). The separating cutter 10 is furthermore equipped with a knife or cutting edge 25, which is rigidly connected with the housing 23, and with a movable knife or cutting edge 26, which is supported by a pivot bolt or stud 27 within the housing 23 and is capable of being actuated by means of a hydraulic cylinder unit 28 (FIG. 5). For this purpose, the piston 28' of the hydraulic cylinder unit 28 is connected with the rear end section of the knife or cutting edge 26; the pertaining cylinder 28'' is secured rotatably about a pivot point 29 on the housing 23, and is adjusted or aligned in the cutting position at least substantially parallel to the longitudinal axis 2' of the guide pipe 2.

The housing 23 is so connected with the console 24 (FIG. 3) and is pivotal by means of a further hydraulic cylinder unit 30 in such a manner that the housing is moved from below toward the windings of the winding package 3 located in the region of the cutting edges or cutters 25 and 26 by a movement in counterclockwise direction. The hydraulic cylinder unit 30 is pivotally connected both with the console 24 (FIG. 5) and with the housing 23 (FIG. 3), and in particular by means of a bearing bolt or stud 31 or 32.

The movable knife or cutting edge 26, in a region before the housing 23, is additionally equipped with a closing blade or cutter 26' which defines or limits rearwardly the cutting opening formed by the cutting or knife edges 25 and 26 (FIG. 5).

During the actuation of the separating cutter 10, there exists the possibility that simultaneously several windings pass into the region of the cutting opening and are cut.

To avoid that the additionally cut windings, which surround the guide pipe 2 in a freely movable manner, come into the collecting device 5 together with the previously cut good windings (see FIG. 1), the separating cutter or shears, below the knife or cutting edges 25 and 26 (FIG. 7), is equipped with a clamping device 33 which comprises a clamping piece 34 with a convexity 34' and a counter-holder 35. The clamping piece 34 is immovably connected with the movable cutter 26, while the counter-holder 35 is an immovable component of the knife or cutting edge 25.

Since the clamping device 33 is actuated simultaneously with the separating cutter 10, a cut winding 3' is held securely in the separating cutter 10 until the latter is opened again; the same is true respectively for simultaneously cut windings.

The scrap cutters 13, which, as is the case with the levers 12, are located across from each other in one and the same plane with respect to the guide pipe 2, have as essential component a main cutter body 36 with a knife or cutting edge 36', and a pivot body 37 with a knife or cutting edge 37', the pivot body 37 being connected by way of a pivot bolt 38 with the main cutter body 36. This main cutter body 36, in turn, is movably held by way of a pivot pin or bolt 39 with respect to a stationary adjustment platform 40. The platform 40 is equipped with a pivotally arranged hydraulic cylinder unit 41, with the aid of which the pivotally connected main cutter body 36 is movable toward the guide pipe 2 or is pivotable away therefrom into a rest position illustrated in FIG. 2. The cutting procedure is initiated by means of a further hydraulic cylinder unit 42 which is pivotally fastened both at the main cutter body 36 and also at the pivot body 37.

The extending or moving-out movement of the piston 42' of the cylinder unit 42 has as a consequence that both cutting edges 36' and 37' of the scrap cutter 13 are moved toward each other.

The carry-along levers 12 are respectively secured by a pivot pin or bolt 43 on a longitudinal wall 44 of the adjustment platform 40, whereby the pivot pin or bolt 43 is additionally articulately connected by a pivot arm 45 (lower half of FIG. 2) to a hydraulic cylinder unit 46; this hydraulic cylinder unit 46 in turn is pivotally connected with the adjustment platform 40.

The carry-along levers 12 serve to advance with certainty the scrap windings, which are separated from the good windings, into the cutter openings, of the scrap cutter 13, formed by the cutting edges 36' and 37'.

Expediently, the hydraulic cylinder units 46 are connected in such a manner that the carry-along or synchronizing lever means 12 are actuated with an adjustable time delay after retraction of the stop rods 9, 11 from the guide pipe 2.

The winding packages 3 (see FIG. 3), which follow each other in sequence, are supported on two endless chains 47 and 48 that extend parallel to the longitudinal extension and longitudinal axis 2' of the guide pipe 2. The endless chains, which are illustrated entirely schematically for clarity and understanding, are supported in turn on non-illustrated guide rollers, and by way thereof on consoles 47', 48'.

The elimination device described in detail in the foregoing paragraphs operates as follows:

The winding package 3 brought from the left in the direction of the arrow 6 is detected or sensed by the photocell 22. As a result, a counting procedure is triggered in a subsequently connected counting device; the counting device is advantageously adjustable in such a manner that upon reaching a predetermined counted value, a control impulse is triggered or released.

As soon as a predetermined number of windings, in other words first the scrap windings, of the front segment of the winding package 2, which are to be separated from the good windings, have moved past the photocell 22, the operating rod 11 is extended toward the guide pipe 2 with an adjustable time delay for passage of the windings; as a result, the last scrap winding is separated from the first subsequent good winding. The actuating impulse for the lowering of the front stop rod is generated by a delay device which takes into account the passage time of the windings between the photocell 22 and the stop rod 11, and accordingly operates as a function of speed. Approximately simultaneously or also time delayed with respect to the extension of the stop rod 11, the carry-along lever means 12 are actuated to guide the scrap windings of the front segment into the region of the cutter opening, of the scrap cutters 13, limited or defined by the cutting edges 36' and 37'. These cutting edges, already before the extension of the stop rod 11 toward the guide pipe 2, occupy the operating position illustrated in FIG. 4, in which the cutting edges partially enter or engage into non-illustrated recesses of the guide pipe 2. The scrap windings which are separated by actuation of the scrap cutters 13, either drop directly upon the scrap removal plate and from there into the scrap container 8, or are dropped upon the scrap removal plate 7 by means of the scrap fork 15 and the scrap removal lever 14 laterally past the guide pipe 2.

After the opened scrap cutters 13 and the pertaining carry-along lever means 12 have been swung or pivoted back into their rest position (see FIG. 2), the stop rod is moved upwardly or retracted, so that the subsequent, previously held or secured good windings can be supplied to the collecting device 5 (see FIG. 1).

The carry-along lever means 12 are preferably so connected that they are actuated in a direction toward the guide pipe 2 with an adjustable time delay after the extension or outward travel of the stop rod 11; this means the lever means are pivoted or swung out of the rest position. It is additionally essential that the separating cutters or shears 13 remain swung or pivoted out until both the scrap windings of the rear segment of the preceding winding package and also the scrap windings of the front segment of the subsequent winding package have come into the cutting opening; the separating cutters or shears 13 serve accordingly not only for separating the scrap windings of the front segment from the subsequent good windings, but rather also serve simultaneously to divide or separate the scrap windings of the sequentially following rear and front segments.

As soon as the photocell 22 has determined the end of the winding package, the rear stop rod 9 is extended or moved out with an adjustable time delay in such a manner toward the guide pipe 2 that the stop rod 9 is pushed between the last good winding and the first scrap winding of the rear segment of the particular winding package 3. Simultaneously, or substantially simultaneously (i.e. adjustable as to time) with the extension or outward travel of the stop rod 9, the separating cutter or shears 10 swings or pivots in counterclockwise direction into the cutting position and separates the good windings from the subsequent scrap windings of the rear segment. Windings which are possibly simultaneously cut therewith are held or secured by the clamping device 33 (see FIG. 7) until the cutters 25 and 26 of the separating cutter or shears 10 are again opened.

During the time when the separating cutter 10 carries out the separating procedure, the good windings are supplied to the collecting device 5 which is connected after the removal device (see FIG. 1). After all good windings have passed the scrap cutters or shears 13, these pivot into the operating position in clockwise direction with opened cutting edges 36' and 37', in which operating position they project in part into the guide pipe 2. Subsequently, the stop rod 9 is retracted, or the separating cutter 10 is opened and by swinging or pivoting in a direction toward the console 24 (see FIG. 3) is moved back into its rest position. The now released scrap windings of the rear segment are pushed into the opened scrap cutters or shears 13, located in operating position, with the aid of the carry-along lever means 12. The already described cutting procedure is now repeated, as a result of which simultaneously the scrap windings of the rear segment of the preceding winding package and the scrap windings of the front segment of the subsequent winding package are separated and are made capable of being removed or carried away by the scrap removal plate 7.

The scrap removal lever 14 is pivotally connected by means of a pivot axis 14' with one of the adjustment platforms 40 (FIG. 2). The photocell 22, or the non-illustrated counting device cooperating therewith, are advantageously so connected that the counting procedure is initiated again after passage of each winding package 3.

Figure 10:
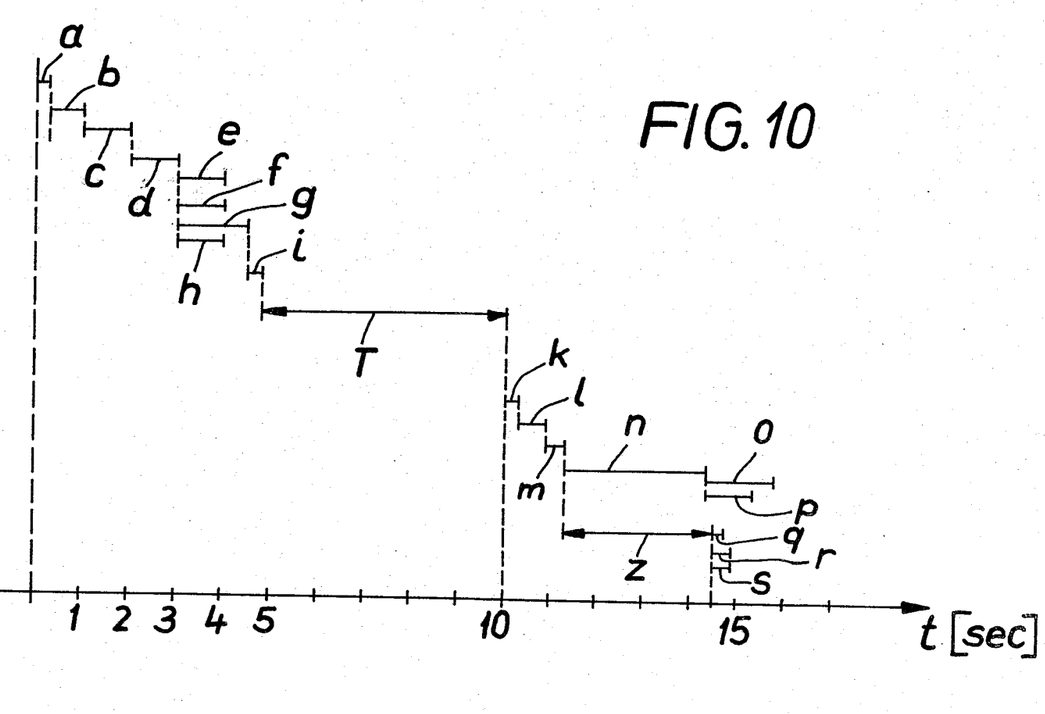
FIG. 10 is a schematic representation of the method steps carried out in time sequence and in time duration, preferably by means of the removal device illustrated in FIGS. 2-7 inclusive.

FIG. 10 shows the sequence of the essential steps of the method preferably carried out by means of the removal device or apparatus just described. The individual method steps are shown with small or lower case letters and are plotted against time t.

After detecting a predetermined number of scrap windings, the non-illustrated counting device connected after the photocell 22 triggers or releases a control impulse a (see for example FIG. 2), which preferably brings about sequentially in time the lowering b of the front stop rod 11 (see FIG. 2) toward the guide pipe 2, the pivoting out c of the carry-along lever means 12, and the cutting step d of the scrap cutters or shears 13. As also apparent from FIG. 10, the method steps b, c and d are advantageously attuned or matched with respect to each other in such a manner that the subsequent method step is respectively initiated only after termination of the preceding method step. The lowering procedure of the front stop rod 11 can, however, dependent upon the magnitude of the transporting speed of the winding packages, also occur in such a manner that the stop rod either reaches the final position a predetermined time before the actuation of the carry-along lever means 12, or a predetermined time after the beginning of the pivot movement of the carry-along lever means 12.

After termination of the cutting procedure of the scrap cutters or shears 13, which means after the separation of the scrap windings of the respective winding package, simultaneously or substantially simultaneously the method steps of opening e of the scrap cutters, dropping or throwing-off f of the separated scrap windings, returning or pivoting back g of the scrap cutters 13, and returning or pivoting back h of the carry-along lever means 12 into the particular rest position can be carried out. After termination of the returning or pivoting-back step g of the scrap cutters 13, which means preferably approximately 0.5 seconds after termination of the method steps e, f, and h, the upward travel or retracting i of the front step rod 11 is carried out.

The time interval between the control impulse a and the termination of the retraction i of the stop rod 11 amounts to about 4.8 seconds.

The duration or time interval which elapses after termination of the method step i until initiation of the handling of the scrap windings of the rear segment is designated with T; during this time interval, the good windings and the adjoining scrap windings of the rear segment are moved toward the collecting device 5 schematically illustrated in FIG. 1.

As soon as the photocell 2, represented, for example, in FIG. 2, has detected or sensed the end of the winding package, a second control impulse k is released or triggered from the subsequently connected counting device, and this control impulse k in sequence brings about the lowering l of the rear stop rod 9, the swinging or pivoting-in m of the separating cutter 10 into the operating position, and the cutting step n of the separating cutter, before simultaneously or substantially simultaneously the pivoting or swinging-in o of the scrap cutter 13 into the operating position and the swinging or pivoting-in p of the scrap removal lever 14 into the removal position are brought about or initiated.

The time sequence of the method steps o and p with respect to the method step n can preferably also be so selected that the method steps o and p are initiated only a certain time after termination or also before termination of the separating step n.

The schematic illustration further shows that the step of raising q of the rear stop rod 9, the opening r of the separating cutter 10, and the returning or pivoting back s of the separating cutter into its rest position are brought about simultaneously or approximately simultaneously.

In this connection, essential meaning is attributed thereto that the beginning or start of the method steps q, r, and s, especially the beginning of the raising step q of the stop rod 9, can be released or triggered with the adjustable time delay z after termination of the method step m. The counting device connected after the photocell 22 is equipped with a preselection device for this purpose, by means of which the control impulse for the actuation of the rear stop rod 9 (method step q) can be delayed with a triggering or release accuracy in a magnitude of centimeters.

The time interval between the second control impulse k and the termination of the method steps q to s amounts to approximately 4.5 to 5 seconds; in the event that the time interval between two winding packages following each other in sequence is less than the just mentioned sequence time, the windings of the subsequent winding package run or bump onto those of the preceding winding package.

The return or setting back of the counting device connected after the photocell 22 is preferably effected by means of a second detector or sensing device; this device generates a suitable resetting or return setting impulse as soon as, for example, the first or the last good winding of a winding package has reached a predetermined section on the guide pipe 2 after leaving the removal device, or has reached a predetermined position with respect to a subsequently connected device.

Figure 8:
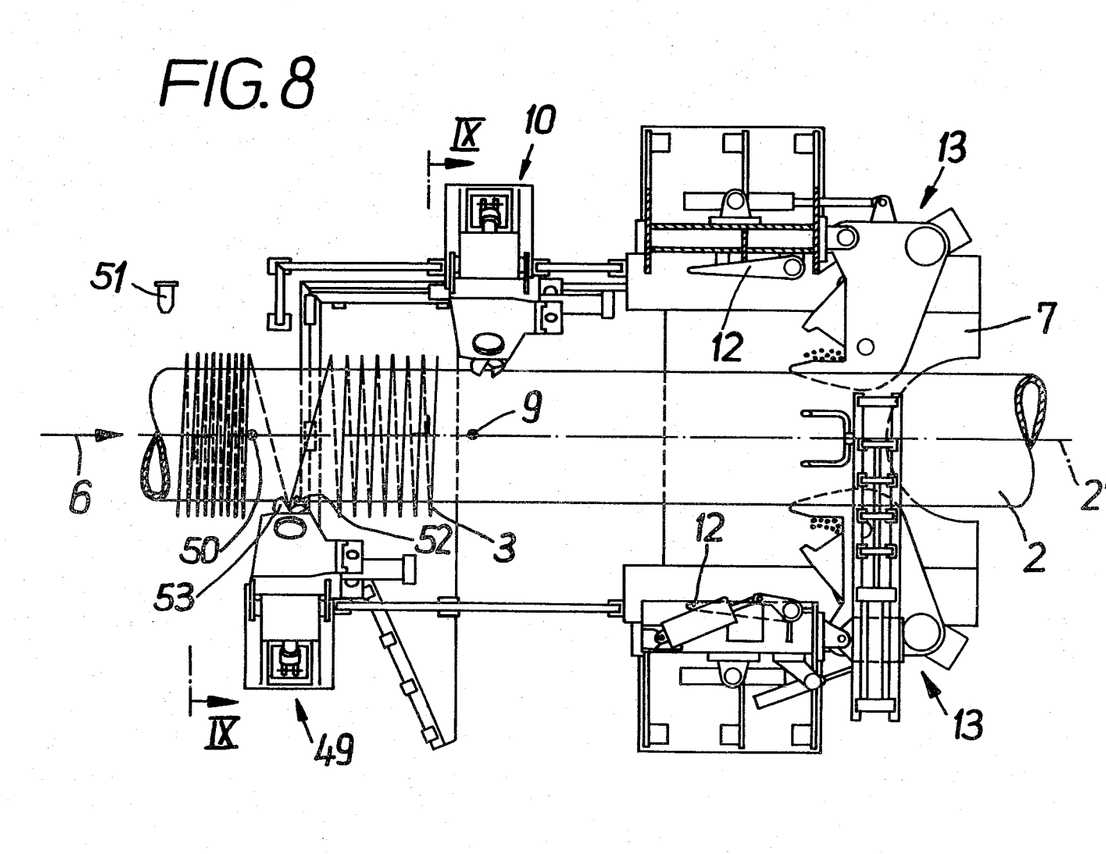
FIG. 8 is a plan view of a removal device equipped with two separating cutters serially arranged one behind the other, both scrap cutters of which are shown in the operating position.
Figure 9:
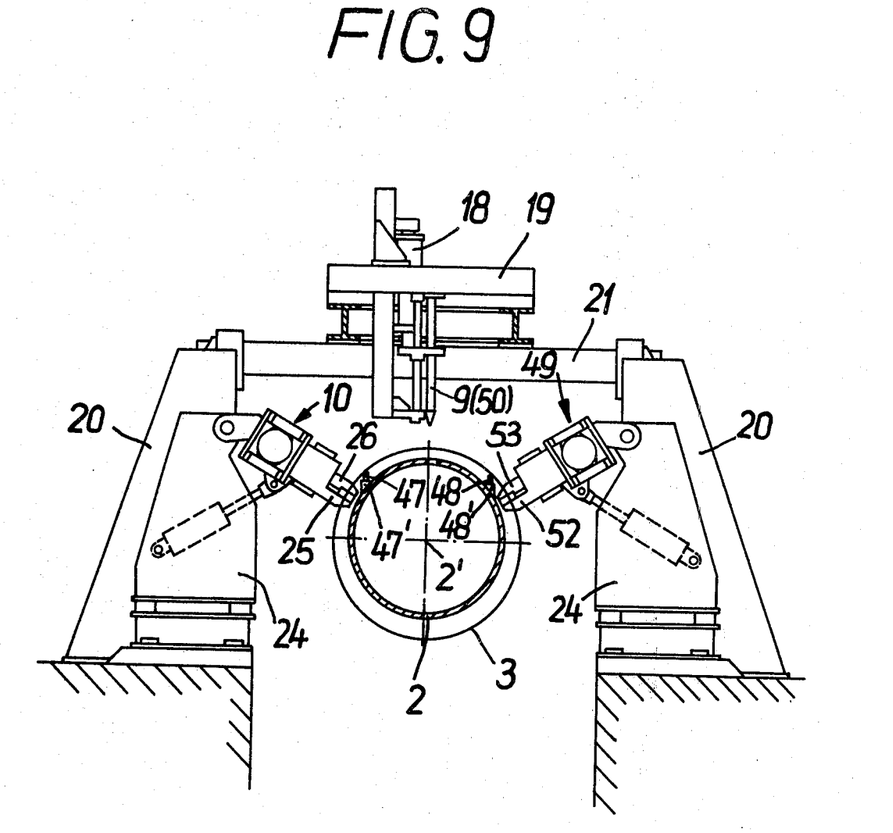
FIG. 9 is a section taken along the line IX—IX in FIG. 8.

The preferred embodiment of the removal device illustrated in FIGS. 8 and 9 differs from the just described embodiment essentially in that this embodiment has two separating cutters or shears 49, 10 arranged on different sides of the guide pipe 2 in an expedient manner and in sequence one after the other in the direction of the arrow 6; the additional separating cutter or shears 49 can be considered identical with the already described separating cutter or shears 10. The first separating cutter 49 is connected with a nominal spacing after a stop rod 50, which is identical in construction when compared with the already described stop rod 9, and which likewise is arranged having a photocell 51 preceding it as with the first preferred embodiment.

The illustrated removal device operates as follows:

After reaching the removal device, the windings of the winding package 3 are detected or sensed by means of the photocell 51 and are counted. During passage of a predetermined number of windings (which means the number of scrap windings of the front segment of the winding package 3 to be separated), the stop rod 50 is moved toward the guide pipe 2 between the last scrap winding of the front segment and the first good winding; directly after this step, the first separating cutter 49 with opened cutting edges 52 and 53 is pivoted or swung in a clockwise direction into the region of a winding (FIG. 9). The first separating cutter 49 is arranged about 1000 mm before the separating cutter 10, which serves to separate the scrap windings of the rear segment of the winding package 3. The separating cutter 49, in contrast to the separating cutter 10, has no clamping device 33, since the possibly too many cut windings are transported away with the scrap windings of the front segment. While the separating cutter 49 is cutting, the preceding scrap windings are already conveyed in the direction of the scrap cutter 13 which, as mentioned above, still occupies its operating position. The pushing-in or insertion of the scrap windings into the cutting opening of the scrap cutter 13 occurs with the aid of the time delay controlled carry-along lever means 12.

After triggering or release of the cutting step, the divided or separated scrap windings are supplied to the scrap container 8 by the scrap removal plate 7 (see FIG. 1), the scrap cutter 13 and the carry-along lever means 12, as well as the separating cutter 49, are swung or pivoted back into their rest position, and the stop rod 50 is retracted from the guide pipe 2, so that the good windings of the winding package 3, which was stopped or held back until this time, can be supplied or fed to the subsequently connected collecting device 5 (see FIG. 1).

The separation and removal of the scrap windings of the rear segment of the winding package 3 occurs in a manner in conformity with the already described first embodiment.

The special advantage of the just described embodiment consists therein that the cutting-through or separation of the scrap windings of the front segment can already be initiated when the separation or cutting of the scrap windings of the rear segment of the preceding winding package has not yet been concluded. A removal device equipped with two separating cutters or shears can accordingly be driven or operated satisfactorily even if the preconnected rolling path or mill works or handles rods or bars which, with a nominal spacing, sequentially follow one another.

The embodiment of the removal device under consideration accordingly makes it possible to increase the production capability of the entire system.

In place of the previously described photocell, other known detecting or sensing devices can also be used, especially those which operate contact free.

With regard to the novel disclosed method and the novel disclosed apparatus, it is only important that directly or indirectly the number of scrap windings and good windings to be separated from each other is determined and the control signal is generated for triggering or releasing the respective separating procedure.

The present invention is, of course, in no way restricted to the specific disclosure of the specification and drawings, but also encompasses any modifications within the scope of the appended claims.

What we claim is:

1. A method of removing front and rear segments of a rolled wire which is fed in the form of winding packages to a collecting device and is subdivided by separating procedures into good and scrap windings, said method including the steps of:

spirally placing the windings of successive winding packages around a guide element;

moving said windings parallel to the longitudinal extension of said guide element;

temporarily preventing movement of the good windings of a given winding package;

severing said windings in the transition region between the scrap windings of the front segment of said given winding package and the subsequent temporarily retained good windings thereof;

further moving said scrap windings;

dividing said scrap windings;

removing said divided scrap windings from the region of said guide element;

temporarily preventing movement of the scrap windings of the rear segment of said given winding package;

separating the good windings of said given winding package in the transition region to the subsequent temporarily retained scrap windings thereof;

moving said good windings toward said collecting device;

removing said last mentioned scrap windings from the region of said guide element.

2. A method according to claim 1, which includes the step of releasing the scrap windings of the rear segment of said given winding package prior to dividing these scrap windings.

3. A method according to claim 2, which includes the step of respectively dividing the scrap windings of the rear segment of said given winding package simultaneously with the dividing of the scrap windings of the front segment of the subsequent winding package.

4. A method according to claim 3, which includes the step of temporarily securely clamping the scrap windings of the rear segment of said given winding package during said step of separating the good windings of said given winding package to prevent these scrap windings from moving with said good windings toward said collecting device.

5. A method according to 4, which includes the steps of sensing in a contact-free manner the windings of a given winding package for the purpose of initiating said separating and severing steps, and, after passage of a predetermined number of scrap windings or total number of windings, generating a control signal for selectively retaining at least one of said good windings and said scrap windings of said rear segment.

6. A method according to claim 5, which includes the step of newly initiating said sensing step with each successive winding package.

7. A method according to claim 6, which includes the step of respectively separately detecting the number of scrap windings of the front segment of a given winding package and the good windings of said given winding package.

8. A method according to claim 7, which includes the step of selectively delaying in time said dividing and separating steps.

9. An apparatus for removing front and rear segments of a rolled wire which is to be fed to it in the form of winding packages, said apparatus being adapted to subdivide winding packages into good and scrap windings, being arranged ahead of a collecting device, and comprising:
a guide element which, in the longitudinal direction thereof, is adapted to movably support windings of winding packages which are in turn adapted to helically surround said guide element;
at least one separating cutter;
a plurality of scrap cutters connected subsequent to said at least one separating cutter in the direction of movement of said winding packages, said scrap cutters being provided with cutting edges which are pivotally arranged with respect to said guide element in the region of said windings; and
two stop elements sequentially arranged in the direction of movement of said winding packages, said stop elements being adapted to be moved toward said guide element and between two adjacent windings.

10. An apparatus according to claim 9, in which a stop element is respectively arranged at least before each separating cutter as seen in the direction of movement of said winding packages.

11. An apparatus according to claim 10, which includes two pivotal scrap cutters oppositely located with respect to said guide element and substantially at right angles to the longitudinal extension thereof, said scrap cutters being adapted to project partially into said guide element in their cutting position.

12. An apparatus according to claim 11, which includes a carry-along lever respectively connected before each scrap cutter as seen in the direction of movement of said winding packages, said carry-along levers being movable relative to said guide element and, in their operating position, being adapted to close a cutter opening defined by said cutting edges and said scrap cutters.

13. An apparatus according to claim 12, which includes a pivotable scrap removal lever having a rotatable scrap fork and arranged in the region of said scrap cutters above said guide element.

14. An apparatus according to claim 13, which includes an adjustment unit operatively connected with a respective stop element, and a spring element interposed between a stop element and its pertaining adjustment unit.

15. An apparatus according to claim 14, in which said stop elements comprise rods respectively provided with a tip directed toward said guide element.

16. An apparatus according to claim 15, in which each of said at least one separating cutters includes cutting edges, each of said separating cutters being pivotal from below into the region of said windings in such a manner that said cutting edges thereof are located at least substantially at right angles to the cross section of the winding which is to be cut.

17. An apparatus according to claim 16, which includes at least one photocell connected before the first separating cutter as seen in the direction of movement of said winding packages for controlling said adjustment unit of at least one stop element.

18. An apparatus according to claim 17, which includes a control member for controlling said scrap cutters in such a way that the cutting procedure is triggered only when the scrap windings of the rear segment of a given winding package and the windings of the front segment of the following winding package are located in the cutting opening defined by said cutting edges of said scrap cutters.

19. An apparatus according to claim 18, which includes one separating cutter provided with cutting edges which define a cutting opening, and a clamping device located below said cutting edges of said separating cutter for securely holding windings located in said cutting opening defined by said cutting edges of said separating cutter, said clamping device being adapted to be actuated with a cutting movement of said apparatus.

20. An apparatus according to claim 19, in which the other stop element is arranged in the region between said separating cutter and said scrap cutters.

21. An apparatus according to claim 18, which includes two separating cutters, the first of which, as seen in the direction of movement of said winding packages, is provided for separating the scrap windings of the front segment of a given winding package, and the other of which is provided for separating the scrap windings of the rear segment of a given winding package.

22. An apparatus according to claim 21, in which said separating cutters are arranged on different sides of said guide element.

23. An apparatus according to claim 9, which includes a scrap removal plate arranged below said guide element in the region of said scrap cutters.

24. An apparatus according to claim 9, in which said guide element comprises a guide pipe provided on the upper half and on both sides thereof with consoles, and which includes an endless chain which extends in the longitudinal direction of said guide pipe and is supported on said consoles.

* * * * *